US011430093B2

(12) United States Patent
Zunjarrao

(10) Patent No.: US 11,430,093 B2
(45) Date of Patent: Aug. 30, 2022

(54) FACE-BASED TONE CURVE ADJUSTMENT

(71) Applicant: Microsoft Technology Licensing, LLC, Redmond, WA (US)

(72) Inventor: Vickrant Jaywant Zunjarrao, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 235 days.

(21) Appl. No.: 16/732,608

(22) Filed: Jan. 2, 2020

(65) Prior Publication Data
US 2021/0097654 A1 Apr. 1, 2021

Related U.S. Application Data

(60) Provisional application No. 62/909,003, filed on Oct. 1, 2019.

(51) Int. Cl.
G06T 5/00 (2006.01)
H04N 5/235 (2006.01)
G06T 5/20 (2006.01)
G06V 40/16 (2022.01)

(52) U.S. Cl.
CPC ............. G06T 5/009 (2013.01); G06T 5/20 (2013.01); G06V 40/164 (2022.01); H04N 5/2353 (2013.01); H04N 5/2355 (2013.01)

(58) Field of Classification Search
CPC .......... G06K 9/00288; G06K 9/00892; G06K 9/00281; G06K 9/00362; G06K 9/4661; G06K 9/00114; G06K 9/00234; G06K 9/00241; G06K 9/4652; G06T 2207/30201; G06T 5/005; G06T 7/11; G06T 17/00; G06T 2207/10016; G06T 2207/20104; G06T 7/00; G06T 5/009; G06T 5/20; G06T 5/40; G06T 7/90; H04N 1/62;
(Continued)

(56) References Cited

U.S. PATENT DOCUMENTS 8,488,958 B2 7/2013 Brunner et al.
9,292,911 B2 3/2016 Paris et al.
9,369,684 B2 6/2016 Lim et al.
(Continued)

FOREIGN PATENT DOCUMENTS

EP 1667066 A1 6/2006

OTHER PUBLICATIONS

Contrast Compensation by Fuzzy Classification and Image Illumination Analysis for Back-lit and Front-lit Color Face Images (Year: 2010).*

(Continued)

Primary Examiner — Nizar N Sivji
(74) Attorney, Agent, or Firm — Holzer Patel Drennan

(57) ABSTRACT

The technology disclosed herein provides a method of providing face-based tone curve adjustment to improve global and local contrast and brightness enhancement. In one implementation, the method includes determining a light level of an image captured by a camera, determining a contrast level of an image captured by a camera, comparing the light level and the contrast level to one or more of a plurality of thresholds, and based on the result of the comparison, selecting an advance intelligent global brightness contrast enhancement (AIGBCE) curve to the image.

20 Claims, 10 Drawing Sheets

(58) Field of Classification Search
CPC ............. H04N 5/23219; H04N 5/2353; H04N 5/2355; H04N 5/23229
See application file for complete search history.

(56) References Cited

U.S. PATENT DOCUMENTS

| | | | |
|---|---|---|---|
| 9,436,870 | B1 | 9/2016 | Mangiat et al. |
| 9,712,743 | B2 | 7/2017 | Corcoran et al. |
| 9,754,362 | B2 | 9/2017 | Kohashi |
| 9,922,452 | B2 | 3/2018 | Son et al. |
| 10,372,971 | B2 | 8/2019 | Rivard et al. |
| 2002/0171852 | A1* | 11/2002 | Zhang ................. H04N 1/4074 358/1.9 |
| 2008/0037838 | A1* | 2/2008 | Ianculescu ........ G06K 9/00234 382/118 |
| 2010/0027072 | A1* | 2/2010 | Enjuji ....................... G06T 5/40 358/3.01 |
| 2010/0188530 | A1* | 7/2010 | Steinberg ................. G06T 5/00 348/234 |
| 2013/0321687 | A1 | 12/2013 | Negroponte et al. |
| 2018/0107096 | A1* | 4/2018 | Hennings ............. H04N 5/2354 |
| 2018/0129870 | A1* | 5/2018 | Bacivarov ................ G06K 9/52 |
| 2019/0057554 | A1* | 2/2019 | Knorr ....................... G06T 7/11 |
| 2019/0108388 | A1* | 4/2019 | Rivard ............... G06K 9/00268 |

OTHER PUBLICATIONS

A robust, low-cost approach to Face Detection and Face Recognition (Year: 2011).*

"International Search Report and Written Opinion Issued in PCT Application No. PCT/US2020/050031", dated Nov. 27, 2020, 10 Pages.

Battiato, et al., "Automatic Image Enhancement by Content Dependent Exposure Correction", In Journal on Applied Signal Processing, Jan. 1, 2004, pp. 1849-1860.

William, et al., "An Example-Based Super-Resolution Algorithm for Selfie Images", In Journal of The Scientific World Journal, vol. 2016, Article ID 8306342, 2016, 12 Pages.

* cited by examiner

FACE-BASED TONE CURVE ADJUSTMENT

CROSS-REFERENCE TO RELATED APPLICATIONS

This application is a non-provisional application of and claims benefit of U.S. Provisional Application Ser. No. 62/909,003 entitled "Face-Based Tone Curve Adjustment" and filed on Oct. 1, 2019, which is incorporated herein by reference in its entirety.

SUMMARY

The technology disclosed herein applies tone curves and/or any other global/local contrast enhancement by using face exposure information along with Gamma/Tone curves and/or global contrast enhancement. As a result, the technology disclosed herein allows preserving all details in highlight and shadow when face-based exposure is on. In disclosed implementations, face-based tone curve/brightness contras enhancement works together with tone curves/gamma/contrast and brightness enhancement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
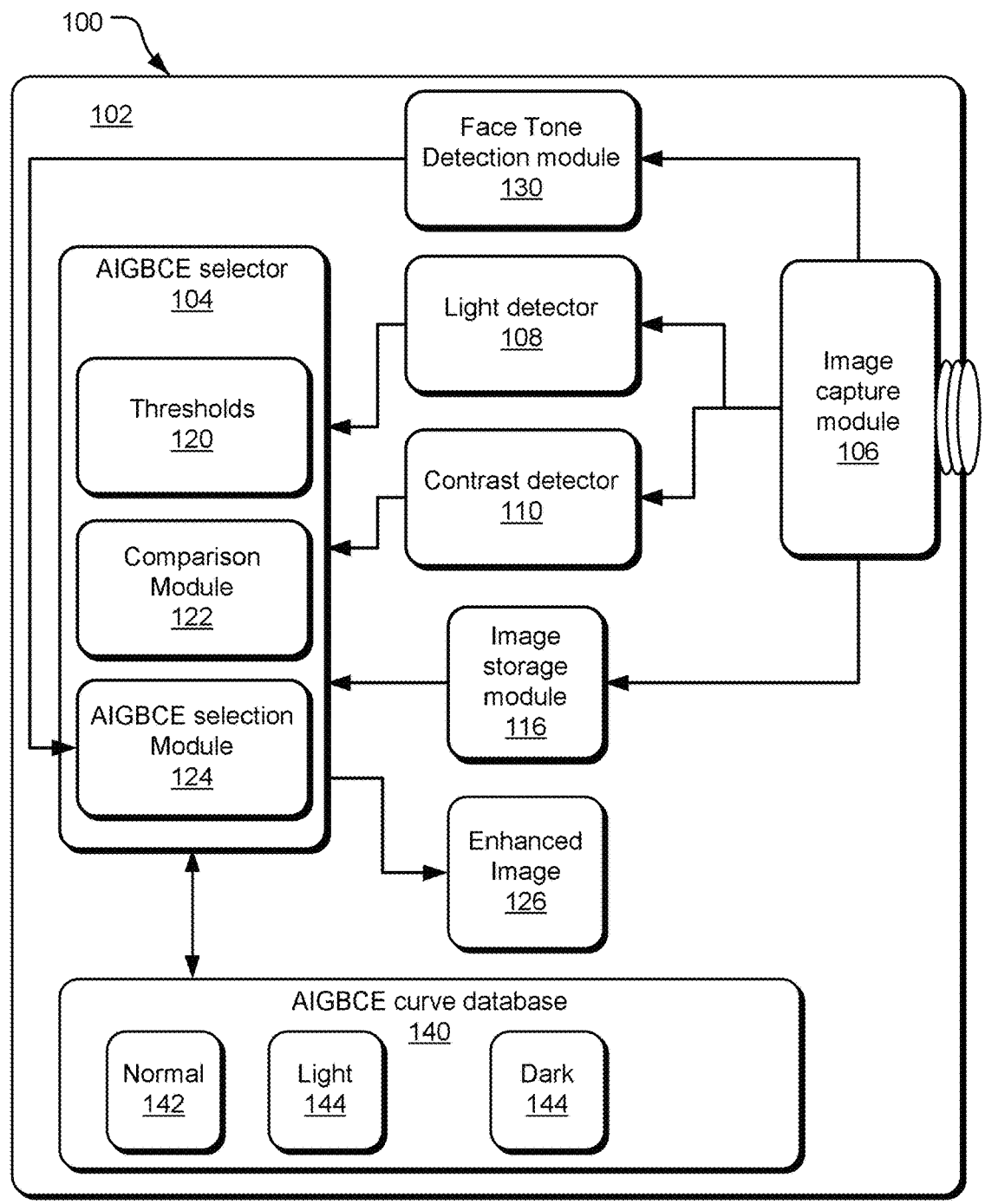
FIG. 1 is an illustration of an example block diagram of a system for selecting the tone curve to apply to an image.
Figure 1:
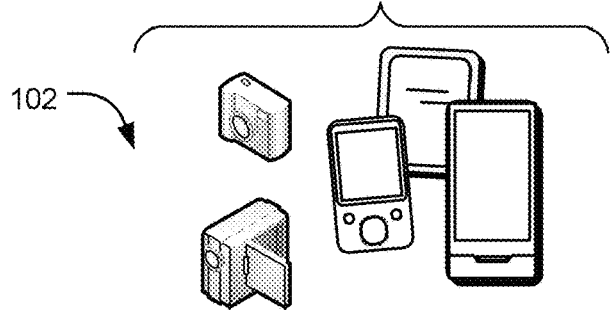

In today's market, electronic device having cameras have face-based auto-exposure (AE). Due to face-based AE, face gets well-lit irrespective of scene however most of the details get clipped in highlight area especially under high contrast and/or brightness scene. Therefore, it creates an unpleasant experience to end users of camera. For the implementations disclosed herein applies tone curves and/or any other global/local contrast enhancement by using face exposure information along with Gamma/Tone curves and/ or global contrast enhancement. As a result, the technology disclosed herein allows preserving all details in highlight and shadow when face-based exposure is on. In disclosed implementations, face-based tone curve/brightness contrast enhancement works together with tone curves/gamma/contrast and brightness enhancement. Under high lux (light) conditions and/or high contrast conditions, the technology disclosed herein improves image quality, and Under low light, where face details get lost (vanish), the technology disclosed herein improves face details, texture and naturalness and therefore, camera visual experience, significantly.

In one implementation, the technology disclosed herein provides a method of providing face-based tone curve adjustment to improve global and local contrast and brightness enhancement. In an example implementation, the method includes determining a light level of an image captured by a camera, determining a contrast level of an image captured by a camera, comparing the light level and the contrast level to one or more of a plurality of thresholds, and based on the result of the comparison, selecting an advance intelligent global brightness/contrast enhancement (AIGBCE) curve to the image. In alternative implementations, other curve enhancement techniques, such as global brightness/contrast enhancement (GBCE), local brightness/contrast enhancement (LBCE), or other brightness/contrast enhancement (BCE) techniques may also be used.

Specifically, GBCE is an important component in a digital camera that improves brightness and contrast of the image/video using adaptive tone mapping under various scene conditions. Specifically, GBCE curves are used to dynamically adjust contrast based on a histogram of an input image. Specifically, the histogram may represent the number of pixels in the image for various intensity values. GBCE curve is applied to improve contrast in the image by effectively spreading out the most frequent intensity values and thus increasing global contrast of images when the initial image has close contrast values. As a result, areas of an image with lower contrasts results in having a higher contrast. As discussed above, the implementations disclosed herein select a GBCE curve that is used to adjust the input histograms to an output histogram based on detection of presence of a face as well as based on the computation of the face tone level.

While a GBCE curve is applied to the entire image, it does not necessarily mean that all parts of the image are transformed due to the application of a GBCE curve. For example, a GBCE curve may only change the contrast levels for some parts of the image, in which case, the curve will have no change for particular luminance level. As an example, looking at FIG. 4, as per curve 404, input luminance at 0.50 may be mapped to output luminance at 0.5 (thus no change in luminance for the pixels that were at luminance of 0.50), while input luminance at 0.15 is mapped to output luminance at 0.1 (thus enhancement in the luminance for the pixels that were at the luminance of 0.10), etc.

Application of different GBCE curve based on detection of a face and based on the face tone level results in image where darker part of image are sufficiently dark, bright areas of the image are sufficiently bright, and the tone steepness between various parts of the image are appropriate.

For front facing camera (FFC) when face is present, the technology disclosed herein helps capturing image details back along with having proper face exposure. During FFC Video for conference call (skype, team, etc.) and during FFC image for selfies, the method disclosed herein gives superior image quality and camera visual experience compared to current solutions.

On the other hand, for rear facing camera (RFC), in which face scene is not the primary use case, the technology disclosed herein is even more valuable. In this case, gamma/ tone curves/contrast enhancement technique is adjusted for non-face-based scenes. Furthermore, when a face in present in scene, the technology disclosed herein can be used to optimized face-based scenes.

FIG. 1 is an illustration of an example block diagram of a system 100 for selecting the tone curve to apply to an image. A device 102 including a camera or other imaging device may include an AIGBCE selector 104. The functioning of one or more components of the AIGBCE selector 104 is disclosed in further detail by their operations as further discussed below in FIGS. 3, 5, and 7. An image capture module 106 including a plurality of lenses may capture images that are stored in an image storage module 116. A light detector 108 detects the light illumination level in the image or scene, which may be measured in lux and represented by L. For example, the light detector 108 may detect luminance level attached to various pixels of an input image and assign a luminance level to the pixels. The light detector 108 may also generate an average luminance level of the image and generate a histogram for various luminance levels where each luminance level is associated with the number or percentage of pixels with that luminance level. In one implementation, the light detector 108 may include a photometer that measures the strength of electromagnetic radiation associated with each pixel. Alternatively, a light meter may be used as the light detector 108 to measure the amount of luminance related to various pixels or at the image level.

A contrast detector 110 detects the contrast level in the image. The contrast level may be measured as a ratio that indicates the difference of light between the brightest white and darkest black in the image or scene and is represented by C. In one implementation, the contrast detector 110 takes input from the light detector 108 for various pixels and analyzes them to detect the pixels with the highest and lowest luminance. Subsequently it calculates the ratio between such highest and lowest luminance levels. In an alternative implementation, the contrast detector 110 may categorizes various pixels as per a histogram and determine the contrast level based on the average of the highest and the lowest histogram levels with pixel above a threshold number. Other methods to detect contrast level may also be used.

The AIGBCE selector 104 may include a threshold store 120 that stores various threshold levels for light level and contrast level, including a low light level L1, a high light level L2, a low contrast level C1, a high contrast level C2, etc. A comparison module 122 compares the light level L and contrast level C of the incoming image with the thresholds. Based on the result of the comparison, an AIGBCE selection module 124 selects an AIGBCE curve from an AIGBCE curve database 140. The AIGBCE curve database 140 may include a large number of curves, which may be stored as look-up tables (LUTs) that provide a relation between an input light or contrast level and an output light or contrast level.

The device 102 also includes a face tone detection module 130 that is configured to analyze the image captured by the image detection module 106 to determine if there is a face detected in the image. If so, the face tone detection module 130 detects the tone of the face. For example, the face tone detection module may use one or more thresholds set in the threshold store 120 to detect the face tone being above or below a threshold. In one implementation, a the threshold store 120 may store one or more face tone thresholds. The face tone detection module 120 may determine the tone of the face and then compare it to the face tone threshold to determine if it is a light face tone or a dark face tone. In an alternative implementation, the determined face tone may be compared to more than one threshold be categorize the determined face tone into more than two groups.

The output of the face tone detection module is input the AIGBCE selection module 124, which selects one of the AIGBCE curve from the AIGBCE database 140 based on the comparison of the face tone to the face tone threshold. The AIGBCE selector 104 uses the selected AIGBCE curve to enhance the image collected from the image capture module 106 and the enhanced image is input to the enhanced image module 126. The enhanced image module 126 may either store the enhanced image for future use or display it on a screen of the device 102.

In one implementation, the AIGBCE curves dynamically adjust the contrast in images based on image histograms to ensure that the darker parts of the images are sufficiently dark, that the bright areas of the images are sufficiently bright, that the image tone steepness is appropriate, and apply any additional tone mapping as necessary. The AIGBCE selector 104 generates enhanced images 126 after application of the selected AIGBCE curve to the image.

Figure 2:
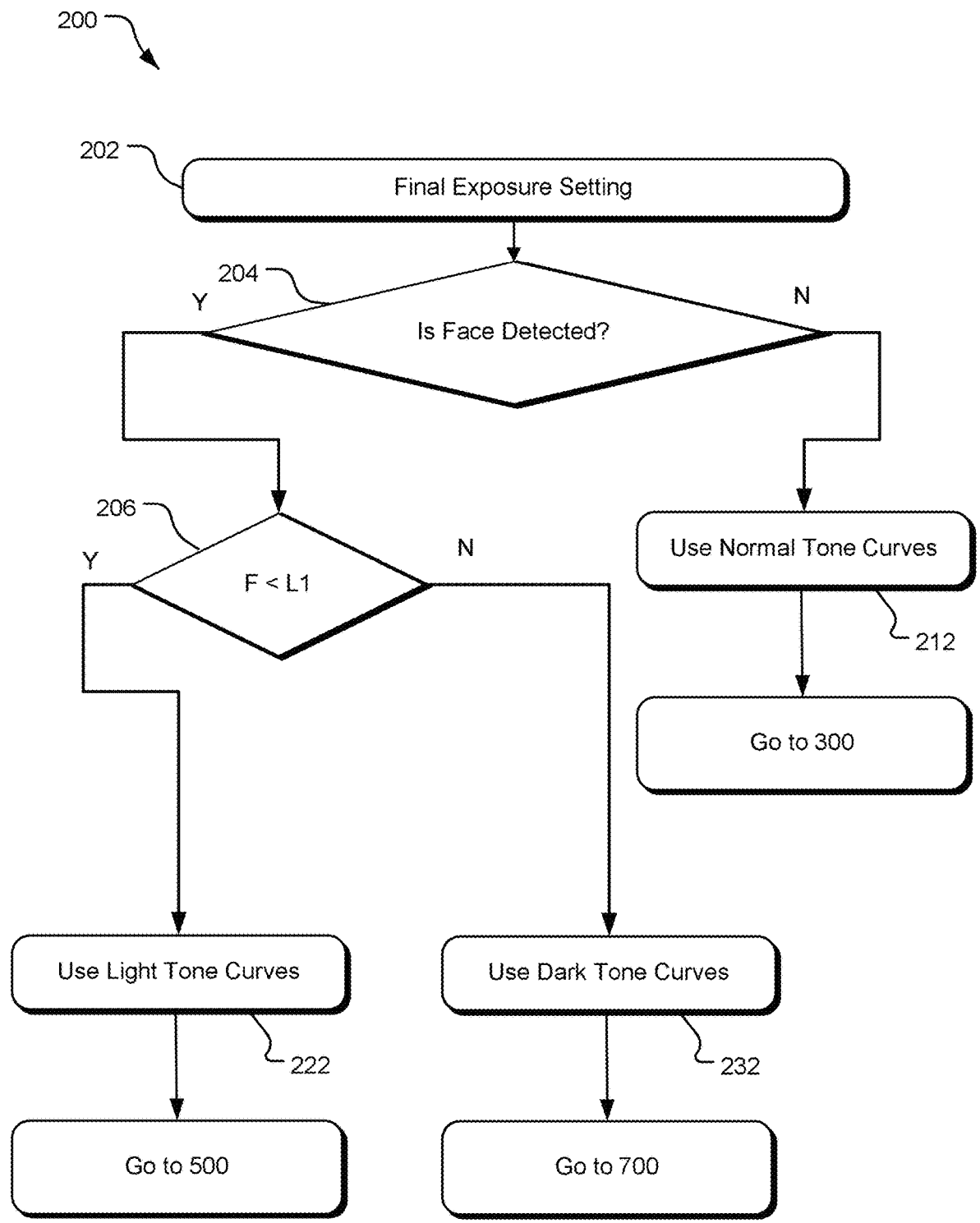
FIG. 2 illustrates example operations for selecting the tone curve to apply to an image.

FIG. 2 illustrates example operations 200 for selecting the tone curve to apply to an image. An operation 202 captures the final exposure settings in the image. An operation 204 analyzes the image to determine if a face is detected as part of the image. If no face is detected, an operation 212 uses normal tone curves to apply to image as presented by a graph 300. If a face is detected, an operation 206 determines if the face has a light skin tone (F<L1) or dark skin tone. Here F is the light level of the face. If the face has light skin tone, at 222 light skin tone curves are applied to the image as presented by a graph 500. If the face has dark skin tone (F>=L1), at 232 dark skin tone curves are applied to the image as presented by a graph 700.

Figure 3:
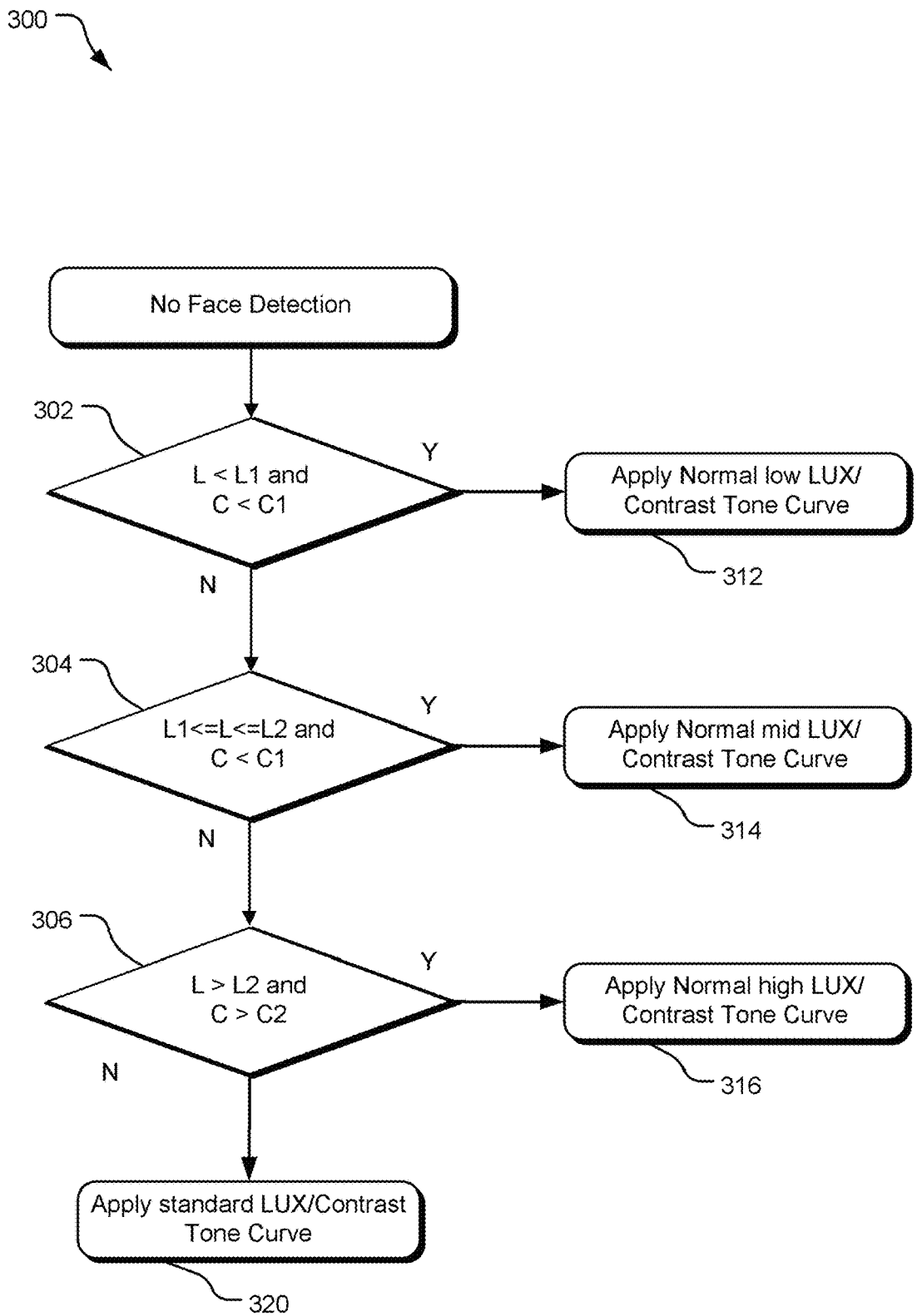
FIG. 3 illustrates example operations when a face is not detected in an image.

FIG. 3 illustrates example operations 300 when a face is not detected in an image. As no face is detected, as given by 300, at 302 the light level L and contrast level C are compared to thresholds L1 and C1 and if L<L1 and C<C1. At 312, normal low lux/contrast tone curve (402) is applied. At 304, L and C are compared to L1, L2, and C1 and if L1<=L<=L2 and C<C1, an operation 314 applies normal mid lux/contrast tone curve (404). An operation 306 compares L and C to L2 and C2 and if L>L2 and C>C2, an operation 316 applies normal high lux/contrast tone curve (406). Otherwise an operation 320 applies standard lux/contrast tone curve.

Figure 4:
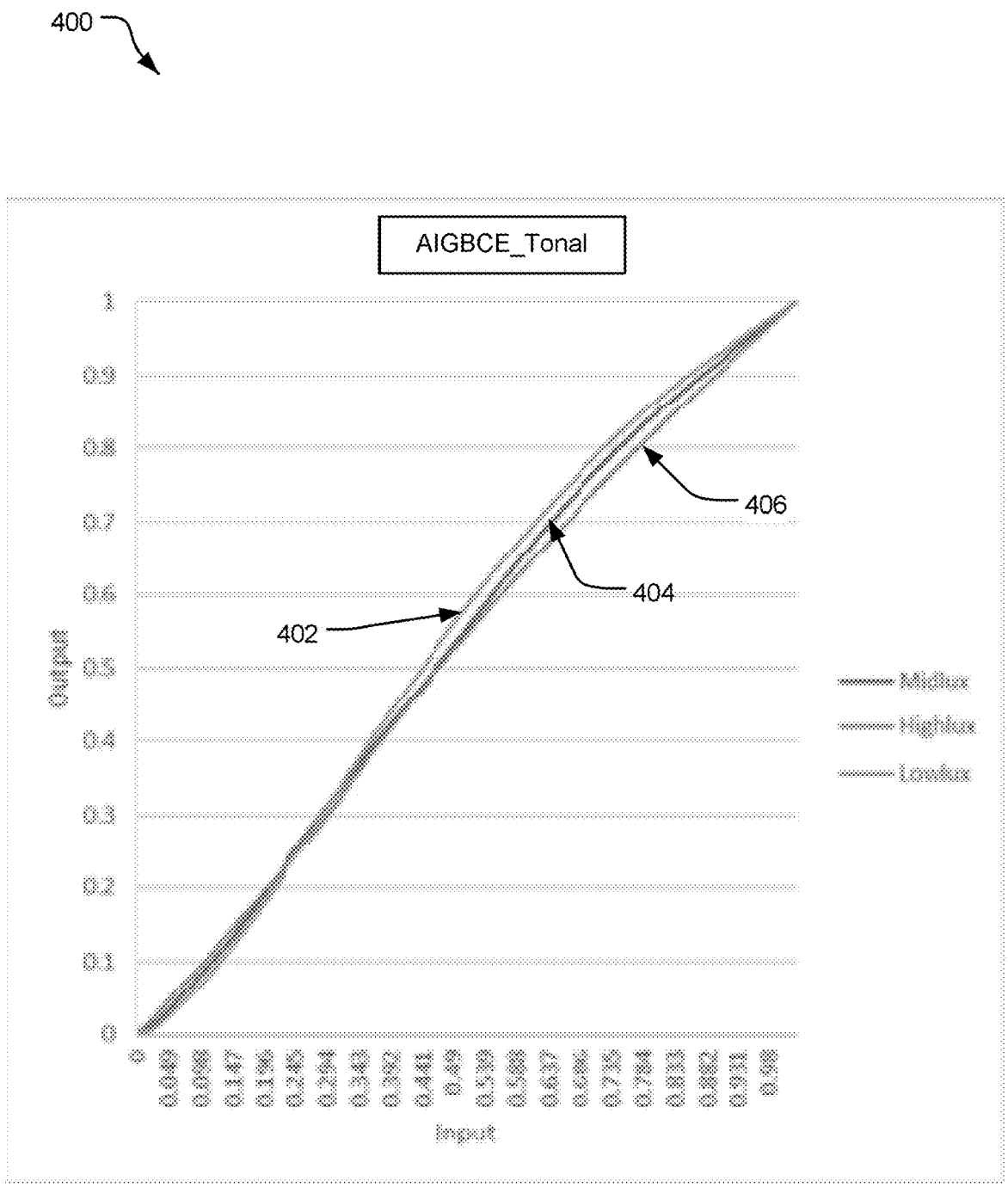
FIG. 4 illustrates the tone curves to be applied when a face is not detected in an image.

FIG. 4 illustrates the tone curves 400 to be applied when a face is not detected in an image. Specifically, FIG. 4 illustrates a normal low lux/contrast tone curve (402), a normal mid lux/contrast tone curve (404), and a normal high lux/contrast tone curve (406).

Figure 5:
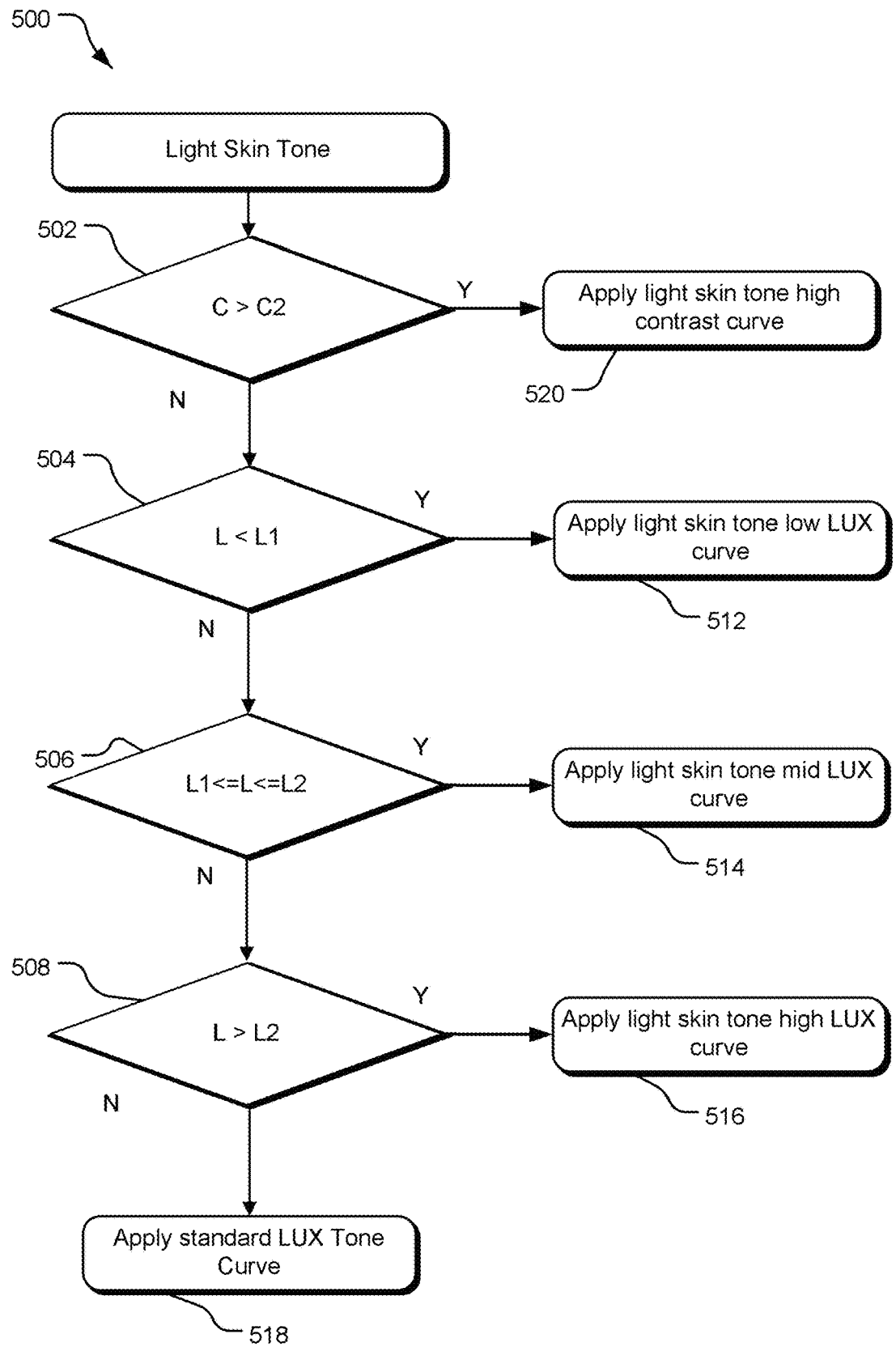
FIG. 5 illustrates example operations when a light skin tone face is detected in an image.

FIG. 5 illustrates example operations 500 when a light skin tone face is detected in an image. As light skin tone face is detected, as given by 500, an operation 502 compares the contrast level and if the contrast level is above a threshold C2, a high contrast curve (608) is applied at an operation 520. However, if the contrast is below the high contrast level C2, an operation 504 compares the light level L of the image with a first light threshold L1. If the light level L of the image is below the first light threshold L1, at 512, a light skin tone low lux tone curve (602) is applied.

At 506, L is compared to L1 and L2 and if L1<=L<=L2 an operation 514 applies a light skin tone mid lux tone curve (604). An operation 508 compares L to L2 if L>L2, an operation 516 applies a light skin tone high lux tone curve (606). Otherwise an operation 518 applies standard lux/contrast tone curve.

Figure 6:
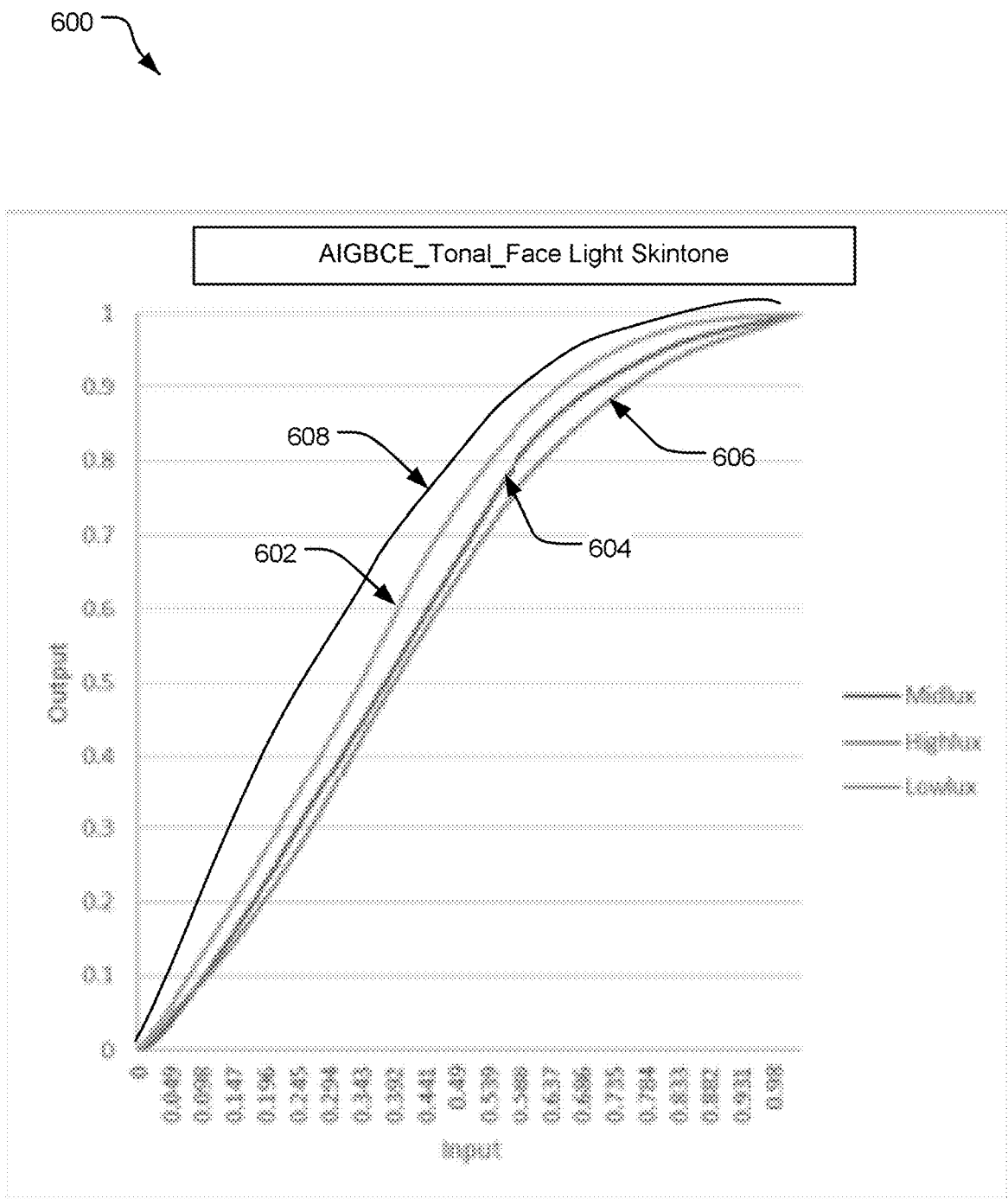
FIG. 6 illustrates the tone curves to be applied when a light skin tone face is detected in an image

FIG. 6 illustrates the tone curves 600 to be applied when a light skin tone face is detected in an image. Specifically, FIG. 6 illustrates a light skin tone low lux tone curve 602, a light skin tone mid lux tone curve 604, a light skin tone high lux tone curve 606, and a light skin tone high contrast curve 608.

Figure 7:
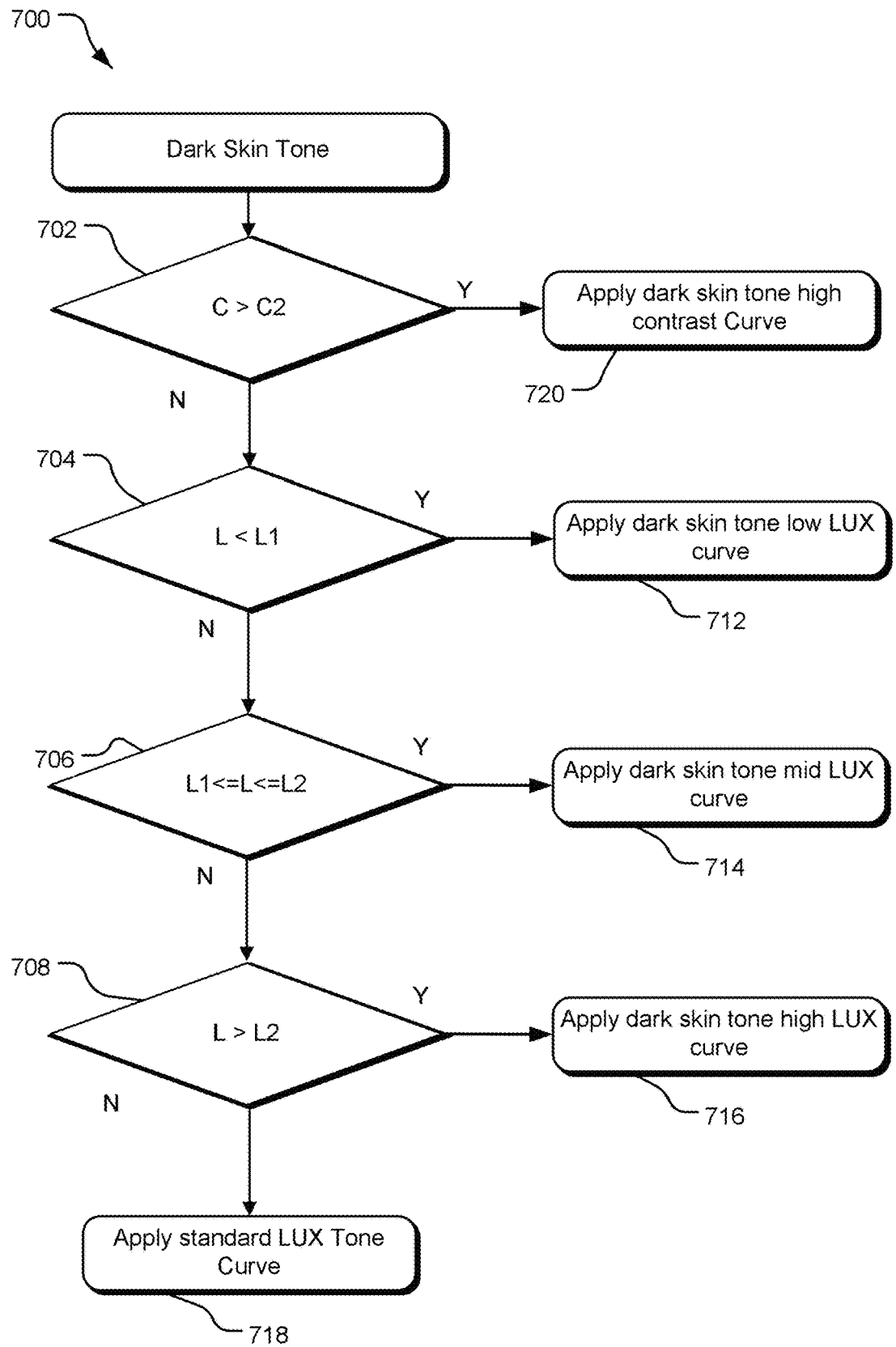
FIG. 7 illustrates example operations when a dark skin tone face is detected in an image.

FIG. 7 illustrates example operations 700 when a dark skin tone face is detected in an image. As dark skin tone face is detected, as given by 700, an operation 702 compares the contrast level and if the contrast level is above a threshold C2, a high contrast curve (808) is applied at an operation 720. However, if the contrast is below the high contrast level C2, an operation 704 compares the light level L of the image with a first light threshold L1. If the light level L of the image is below the first light threshold L1, at 712, a dark skin tone low lux tone curve (802) is applied.

At 706, L is compared to L1 and L2 and if L1<=L<=L2 an operation 714 applies a dark skin tone mid lux tone curve (804). An operation 708 compares L to L2 if L>L2, an operation 716 applies a dark skin tone high lux tone curve (806). Otherwise an operation 718 applies standard lux/contrast tone curve.

Figure 8:
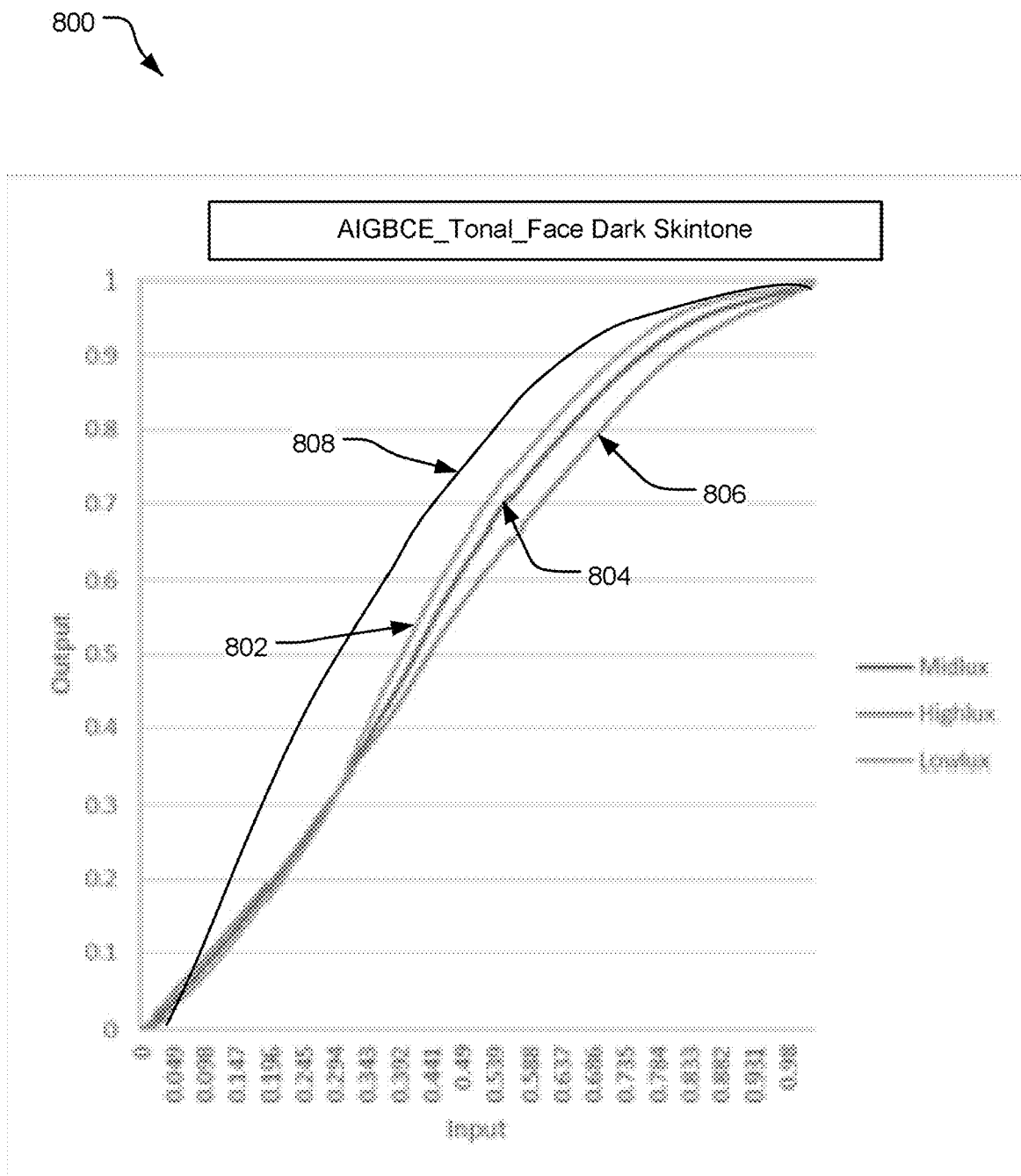
FIG. 8 illustrates the tone curves to be applied when a dark skin tone face is detected in an image.

FIG. 8 illustrates the tone curves 800 to be applied when a dark skin tone face is detected in an image. Specifically, FIG. 8 illustrates a dark skin tone low lux tone curve 802, a dark skin tone mid lux tone curve 804, a dark skin tone high lux tone curve 806, and a dark skin tone high contrast curve 808.

Figure 9:
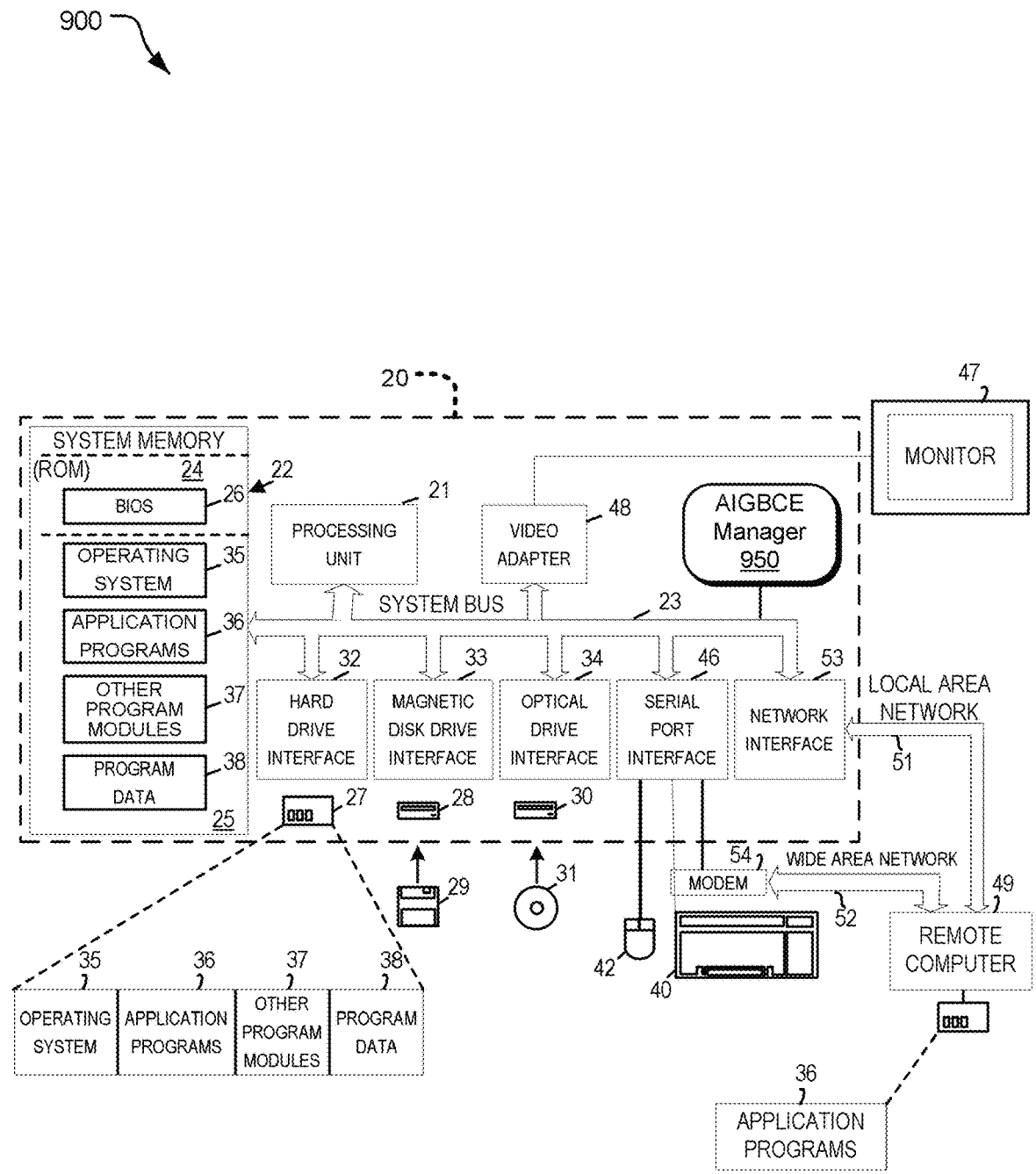
FIG. 9 illustrates an example system that may be useful in implementing the described technology.

The example hardware and operating environment of FIG. 9 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 900, the computer 20 also includes an AIGBCE selector 950 providing one or more functions of the antenna sharing operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a co-ex module as illustrated in FIGS. 1-5. In one implementation, one or more instructions to share an antenna across multiple endpoints may be stored in memory of the computer 20, such as the read-only memory (ROM) 24 and random access memory (RAM) 25, etc.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

While FIG. 9 illustrates a computing device including a magnetic disk drive, an optical disk drive, and a semiconductor memory storage device, in alternative implementations, the computing device may include other types of storage devices, such as a DNA-based storage device, or any other storage device which can be used to store the desired information and which can be accessed by a processor. Such alternative implementations may use a combination of such storage devices that are configured on the computing device or they may be external to the computing device.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for requesting and managing antenna resource may be stored in system memory 22 and/or storage devices 29 or 31 and processed by the processing unit 21. An AIGBCE selector 950 communicatively connected with the processing unit 21 and the memory 22 may enable one or more of the capabilities of the antenna sharing system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 10:
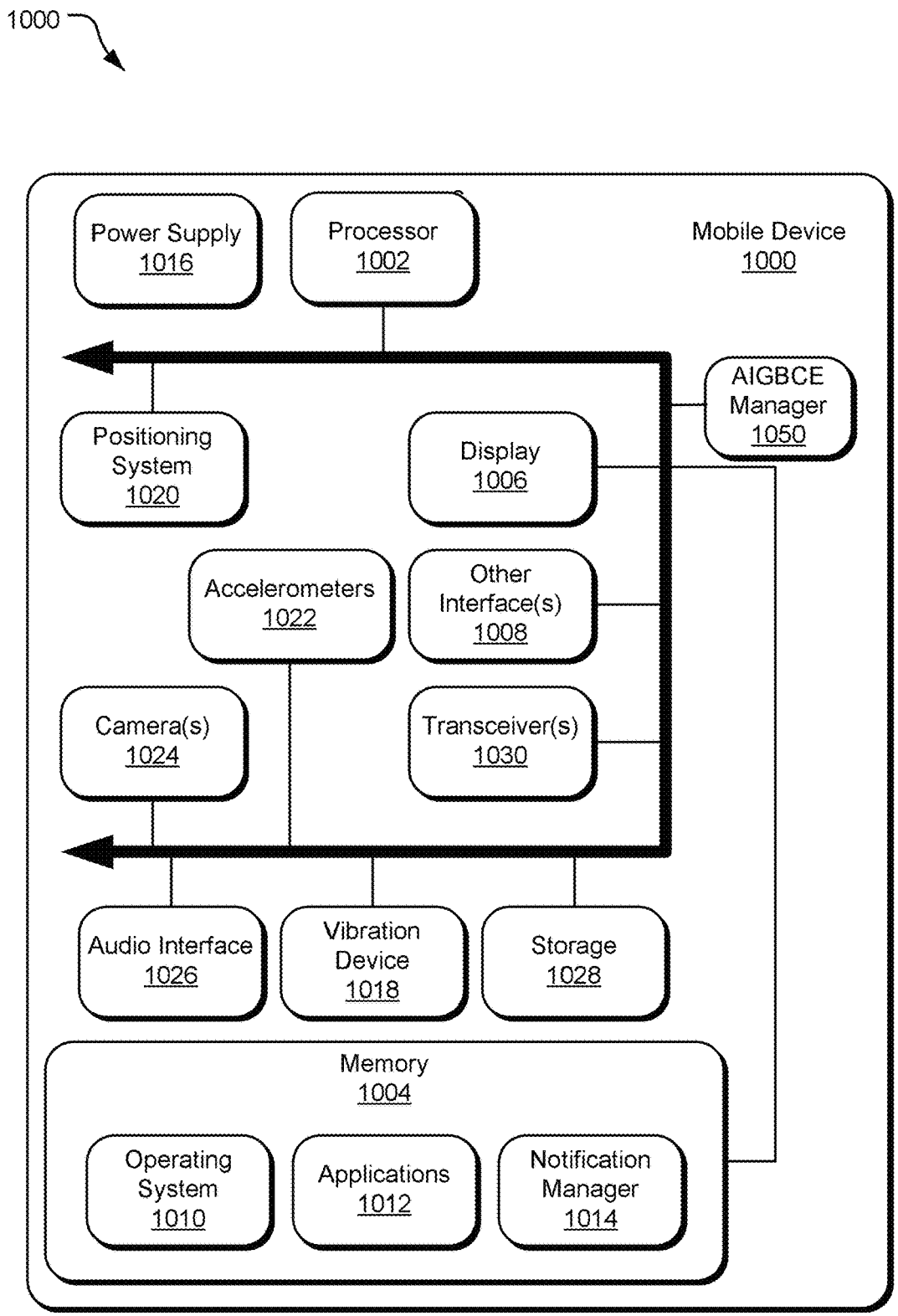
FIG. 10 illustrates an example mobile device that may be useful in implementing the described technology.

FIG. 10 illustrates another example system (labeled as a mobile device 1000) that may be useful in implementing the described technology. The mobile device 1000 includes a processor 1002, a memory 1004, a display 1006 (e.g., a touchscreen display), and other interfaces 1008 (e.g., a keyboard). The memory 1004 generally includes both volatile memory (e.g., RAM) and non-volatile memory (e.g., flash memory). An operating system 1010, such as the Microsoft Windows® Phone operating system, resides in the memory 1004 and is executed by the processor 1002, although it should be understood that other operating systems may be employed.

One or more application programs 1012 are loaded in the memory 1004 and executed on the operating system 1010 by the processor 1002. Examples of applications 1012 include without limitation email programs, scheduling programs, personal information managers, Internet browsing programs, multimedia player applications, etc. A notification manager 1014 is also loaded in the memory 1004 and is executed by the processor 1002 to present notifications to the user. For example, when a promotion is triggered and presented to the shopper, the notification manager 1014 can cause the mobile device 1000 to beep or vibrate (via the vibration device 1018) and display the promotion on the display 1006.

The mobile device 1000 includes a power supply 1016, which is powered by one or more batteries or other power sources and which provides power to other components of the mobile device 1000. The power supply 1016 may also be connected to an external power source that overrides or recharges the built-in batteries or other power sources.

The mobile device 1000 includes one or more communication transceivers 1030 to provide network connectivity (e.g., mobile phone network, Wifi®, BlueTooth®, etc.). The mobile device 1000 also includes various other components, such as a positioning system 1020 (e.g., a global positioning satellite transceiver), one or more accelerometers 1022, one or more cameras 1024, an audio interface 1026 (e.g., a microphone, an audio amplifier and speaker and/or audio jack), and additional storage 1028. Other configurations may also be employed.

In an example implementation, a mobile operating system, various applications, and other modules and services may be embodied by instructions stored in memory 1004 and/or storage devices 1028 and processed by the processing unit 1002. User preferences, service options, and other data may be stored in memory 1004 and/or storage devices 1028 as persistent datastores. An AIGBCE selector 1050 communicatively connected with the processor 1002 and the memory 1004 may enable one or more of the capabilities of the antenna sharing system disclosed herein.

The memory 1004 disclosed in FIG. 10 may be a semiconductor media based memory, optical memory, a DNA based memory, or any other memory that can be used to store the desired information and which can be accessed by a processor. Such alternative implementations may use a combination of such memories that are configured on the mobile device or they may be external to the mobile device.

The face-based tone curve adjustment system disclosed herein provides a solution to a technological problem necessitated by the requirement for sharing an antenna resource across multiple endpoints. Specifically, the antenna sharing system disclosed herein provides an unconventional technical solution to this technological problem by communicating with multiple endpoints to request an antenna resource.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
receiving an image captured by a camera;
determining if a face is detected in the image;
in response to determining that a face is detected in the image, determining a skin tone level of the face;
determining a contrast level of the image and a light level of the image;
selecting an advance intelligent global brightness contrast enhancement (AIGBCE) curve to enhance the image based on the skin tone level of the face from a plurality of AIGBCE curves, the contrast level of the image, and the light level of the image; wherein each of the plurality of AIGBCE curve maps an input brightness level to an output brightness lux level; and
applying the selected AIGBCE curve to the image to dynamically adjust the contrast in the image.

2. The method of claim 1, wherein the method further comprising determining that the skin tone level of the face is below a threshold tone level and in response selecting one of a plurality of a light skin-tone curves to enhance the image.

3. The method of claim 2, wherein the method further comprising determining that the contrast level is above a threshold contrast level and in response selecting a light skin tone high contrast curve to enhance the image.

4. The method of claim 2, wherein the method further comprising determining that the contrast level is below a threshold contrast level and in response selecting one of light skin tone curves to enhance the image.

5. The method of claim 4, wherein the light skin tone curves includes a light skin tone low LUX tone curve, a light skin tone mid LUX curve, and a light skin tone curve high LUX curve.

6. The method of claim 1, wherein the method further comprising, determining that the skin tone level of the face is above a threshold tone level and in response selecting one of a plurality of a dark skin-tone curves to enhance the image.

7. The method of claim 6, wherein the method further comprising determining that the contrast level is above a threshold contrast level and in response selecting a dark skin tone high contrast curve to enhance the image.

8. The method of claim 6, wherein the method further comprising determining that the contrast level is below a threshold contrast level and in response selecting one of dark skin tone curves to enhance the image.

9. The method of claim 8, wherein the dark skin tone curves includes a dark skin tone low LUX tone curve, a dark skin tone mid LUX curve, and a dark skin tone curve high LUX curve.

10. A physical article of manufacture including one or more non-transitory computer-readable storage media, encoding computer-executable instructions for executing on a computer system a computer process, the computer process comprising:
   receiving an image captured by a camera;
   determining if a face is detected in the image;
   in response to determining that a face is detected in the image, determining a skin tone level of the face;
   determining a contrast level of the image and a light level of the image;
   selecting an advance intelligent global brightness contrast enhancement (AIGBCE) curve to enhance the image based on the skin tone level of the face from a plurality of AIGBCE curves, the contrast level of the image, and the light level of the image; wherein each of the plurality of AIGBCE curve maps an input brightness level to an output brightness lux level; and
   applying the selected AIGBCE curve to the image to dynamically adjust the contrast in the image.

11. The physical article of manufacture of claim 10, wherein the computer process further comprising determining that the skin tone level of the face is below a threshold tone level and in response selecting one of a plurality of a light skin-tone curves to enhance the image.

12. The physical article of manufacture of claim 11, wherein the computer process further comprising determining that the contrast level is above a threshold contrast level and in response selecting a light skin tone high contrast curve to enhance the image.

13. The physical article of manufacture of claim 11, wherein the computer process further comprising determining that the contrast level is below a threshold contrast level and in response selecting one of light skin tone curves to enhance the image.

14. The physical article of manufacture of claim 13, wherein the light skin tone curves includes a light skin tone low LUX tone curve, a light skin tone mid LUX curve, and a light skin tone curve high LUX curve.

15. The physical article of manufacture of claim 10, wherein the method further comprising, determining that the skin tone level of the face is above a threshold tone level and in response selecting one of a plurality of a dark skin-tone curves to enhance the image.

16. The physical article of manufacture of claim 15, wherein the dark skin tone curves include a dark skin tone low LUX tone curve, a dark skin tone mid LUX curve, and a dark skin tone curve high LUX curve.

17. In a computing environment, a system comprising:
   memory;
   one or more processor units;
   a camera to capture an image;
   a face detection module to detect presence of a face in the image and in response to determining that a face is detected in the image, determine a tone level of the face;
   a contrast detector to determine contrast level in the image; and
   a global brightness contrast enhancement (AIGBCE) selector configured to select an AIGBCE curve to enhance the image based on the skin tone level of the face from a plurality of AIGBCE curves, the contrast level of the image, and the light level of the image; wherein each of the plurality of AIGBCE curve maps an input brightness level to an output brightness lux level and apply the selected AIGBCE curve to the image to dynamically adjust the contrast in the image.

18. The system of claim 17, wherein the AIGBCE selector is further configured to determine that the skin tone level of the face is below a threshold tone level and in response selecting one of a plurality of a light skin-tone curves to enhance the image.

19. The system of claim 18, wherein the AIGBCE selector is further configured to determine that the contrast level is above a threshold contrast level and in response to select a light skin tone high contrast curve to enhance the image.

20. The system of claim 18, wherein the AIGBCE selector is further configured to determine that the contrast level is below a threshold contrast level and in response to select one of light skin tone curves to enhance the image.

* * * * *